United States Patent
Flessas

(10) Patent No.: US 11,425,308 B2
(45) Date of Patent: Aug. 23, 2022

(54) ROBOTICALLY MOVABLE DISPLAY SYNCHRONOUSLY MOVABLE WITH ROBOTICALLY MOVABLE CAMERA FOR DISPLAYING CAPTURED IMAGES IN IDENTICAL ORIENTATION

(71) Applicant: Andrew Flessas, Columbia, TN (US)

(72) Inventor: Andrew Flessas, Columbia, TN (US)

(*) Notice: Subject to any disclaimer, the term of this patent is extended or adjusted under 35 U.S.C. 154(b) by 0 days.

(21) Appl. No.: 17/109,450

(22) Filed: Dec. 2, 2020

(65) Prior Publication Data

US 2022/0174220 A1    Jun. 2, 2022

(51) Int. Cl.
*H04N 5/232*    (2006.01)
*B25J 9/16*    (2006.01)
*B25J 13/08*    (2006.01)
*H04N 5/225*    (2006.01)

(52) U.S. Cl.
CPC ........ *H04N 5/23299* (2018.08); *B25J 9/1697* (2013.01); *B25J 13/08* (2013.01); *H04N 5/2253* (2013.01); *H04N 5/225251* (2018.08)

(58) Field of Classification Search
CPC ......... H04N 5/23299; H04N 5/225251; H04N 5/2253; B25J 9/1697; B25J 13/08
See application file for complete search history.

(56) References Cited

U.S. PATENT DOCUMENTS

| | | |
|---|---|---|
| 4,680,519 A | 7/1987 | Chand et al. |
| 4,706,000 A | 11/1987 | Kishi et al. |
| 4,774,445 A | 9/1988 | Penkar |
| 4,868,473 A | 9/1989 | Kato |
| 5,078,021 A | 1/1992 | Freywiss |
| 5,255,096 A | 10/1993 | Boyle |
| 5,355,063 A | 10/1994 | Boone et al. |
| 5,413,454 A | 5/1995 | Movsesian |
| 5,448,225 A | 9/1995 | Maignon et al. |
| 5,496,086 A | 3/1996 | Adrian et al. |
| 5,596,683 A | 1/1997 | Kasagami et al. |
| 5,628,660 A | 5/1997 | Onitsuka |
| 5,652,849 A | 7/1997 | Conway et al. |
| 5,683,068 A | 11/1997 | Chase et al. |
| 5,708,527 A | 1/1998 | Adamson et al. |

(Continued)

FOREIGN PATENT DOCUMENTS

| | | |
|---|---|---|
| EP | 2 922 287 | 8/2015 |
| JP | 2000-267579 | 9/2000 |
| KR | 10-2004-0096097 | 11/2004 |

OTHER PUBLICATIONS

Written Opinion and Search Report for PCT Application No. PCT/US19/48746, dated Nov. 20, 2019, 22 pages.

*Primary Examiner* — Christopher K Peterson
(74) *Attorney, Agent, or Firm* — Weide & Miller, Ltd.

(57) ABSTRACT

A system includes a robotic camera and a robotic display. The robotic camera has a robotic camera mount that moves an image capture device such as a camera and the robotic display has a robotic display mount that moves an image display device, such as a video display. The robotic mounts are used to synchronously move the camera and display so that they are in positions where captured images are displayed in the same orientation, e.g. images captured in a portrait orientation are displayed by the display in the same orientation and images captured in a landscape orientation are displayed by the display in the same orientation.

20 Claims, 5 Drawing Sheets

(56) References Cited

U.S. PATENT DOCUMENTS

| | | |
|---|---|---|
| 5,724,264 A | 3/1998 | Rosenberg et al. |
| 5,773,984 A | 6/1998 | Suyama et al. |
| 5,909,998 A | 6/1999 | Herbermann et al. |
| 5,947,429 A | 9/1999 | Sweere et al. |
| 6,046,711 A | 4/2000 | Kouchi |
| 6,085,670 A | 7/2000 | Genov |
| 6,095,476 A | 8/2000 | Mathis |
| RE36,978 E | 12/2000 | Moscovitch |
| 6,212,784 B1 | 4/2001 | Pittman |
| 6,328,206 B1 | 12/2001 | Schanz et al. |
| 6,427,823 B1 | 8/2002 | Ishikawa |
| 6,437,973 B1 | 8/2002 | Helot et al. |
| 6,456,339 B1 | 9/2002 | Surati et al. |
| 6,507,163 B1 | 1/2003 | Allen |
| 6,655,645 B1 | 12/2003 | Lu et al. |
| 6,708,940 B2 | 3/2004 | Ligertwood |
| 6,807,461 B2 | 10/2004 | Kneifel |
| 6,826,963 B2 | 12/2004 | Liu et al. |
| 6,914,622 B1 | 7/2005 | Smith et al. |
| 7,022,962 B2 | 4/2006 | Ohtomo |
| 7,043,335 B2 | 5/2006 | Yoshida et al. |
| 7,092,001 B2 | 8/2006 | Schulz |
| 7,123,285 B2 | 10/2006 | Smith et al. |
| 7,154,526 B2 | 12/2006 | Foote et al. |
| 7,163,249 B2 | 1/2007 | Schmidt et al. |
| 7,296,774 B2 | 11/2007 | Oh |
| 7,414,603 B2 | 8/2008 | Tseng |
| 7,463,821 B2 | 12/2008 | DiFrancesco et al. |
| 7,500,550 B2 | 3/2009 | Strong et al. |
| 7,545,108 B2 | 6/2009 | Flessas |
| 7,559,766 B2 | 7/2009 | Epley |
| 7,576,830 B2 | 8/2009 | DiFrancesco |
| 7,682,357 B2 | 3/2010 | Ghodoussi et al. |
| 7,719,222 B2 | 5/2010 | Theobald |
| 7,720,570 B2 | 5/2010 | Close et al. |
| 7,899,577 B2 | 3/2011 | Ban et al. |
| 8,016,434 B2 | 9/2011 | Turner et al. |
| 8,179,337 B2 | 5/2012 | Wilzbach et al. |
| 8,302,488 B2 | 11/2012 | Hsu et al. |
| 8,356,704 B2 | 1/2013 | Flessas |
| 8,380,349 B1 | 2/2013 | Hickman et al. |
| 8,655,429 B2 | 2/2014 | Kuduvalli et al. |
| 8,825,225 B1 | 9/2014 | Stark et al. |
| 8,896,242 B2 | 11/2014 | Flessas |
| 8,944,609 B2 | 2/2015 | Fox et al. |
| 8,998,797 B2 | 4/2015 | Omori |
| 9,067,322 B2 | 6/2015 | Keibel et al. |
| 9,423,608 B2 | 8/2016 | Doyle et al. |
| 9,604,361 B2 | 3/2017 | Gustafsson et al. |
| 9,794,533 B2 | 10/2017 | Flessas |
| 9,823,693 B2 | 11/2017 | Flessas |
| 10,867,396 B1 * | 12/2020 | Li ................ G05D 1/0253 |
| 2003/0089267 A1 | 5/2003 | Ghorbel et al. |
| 2003/0135203 A1 | 7/2003 | Wang et al. |
| 2003/0144649 A1 | 7/2003 | Ghodoussi et al. |
| 2003/0224333 A1 | 12/2003 | Vastvedt |
| 2004/0066612 A1 | 4/2004 | Yu |
| 2004/0199290 A1 | 10/2004 | Stoddard |
| 2004/0202445 A1 | 10/2004 | DiFrancesco |
| 2004/0249507 A1 | 12/2004 | Yoshida et al. |
| 2004/0257021 A1 * | 12/2004 | Chang ............. G05B 19/427 |
| | | 318/568.21 |
| 2005/0038416 A1 | 2/2005 | Wang et al. |
| 2005/0110867 A1 | 5/2005 | Schulz |
| 2005/0219356 A1 | 10/2005 | Smith et al. |
| 2006/0061124 A1 | 3/2006 | Schmidt et al. |
| 2006/0074525 A1 | 4/2006 | Close et al. |
| 2006/0184272 A1 | 8/2006 | Okazaki et al. |
| 2007/0064092 A1 | 3/2007 | Sandberg et al. |
| 2007/0086155 A1 | 4/2007 | Chen et al. |
| 2007/0177339 A1 | 8/2007 | Flessas |
| 2007/0195271 A1 | 8/2007 | De Zwart et al. |
| 2007/0250213 A1 | 10/2007 | Poljen et al. |
| 2008/0084566 A1 | 4/2008 | Hessert et al. |
| 2008/0158801 A1 | 7/2008 | Mathews |
| 2009/0003975 A1 | 1/2009 | Kuduvalli et al. |
| 2009/0237873 A1 | 9/2009 | Flessas |
| 2009/0303447 A1 | 12/2009 | Turner et al. |
| 2010/0091688 A1 | 4/2010 | Staszewski et al. |
| 2010/0140046 A1 | 6/2010 | Flessas |
| 2010/0145512 A1 | 6/2010 | Flessas |
| 2011/0249201 A1 | 10/2011 | Turner et al. |
| 2012/0170000 A1 | 7/2012 | Imaoka et al. |
| 2013/0181901 A1 | 7/2013 | West |
| 2013/0199010 A1 | 8/2013 | Osato et al. |
| 2014/0025202 A1 | 1/2014 | Umeno et al. |
| 2014/0031983 A1 | 1/2014 | Low et al. |
| 2014/0102239 A1 | 4/2014 | Umeno |
| 2014/0233099 A1 | 8/2014 | Stark et al. |
| 2015/0015781 A1 | 1/2015 | Flessas |
| 2016/0024781 A1 | 1/2016 | Flessas |
| 2016/0065920 A1 * | 3/2016 | Flessas ............ G03B 21/145 |
| | | 348/383 |
| 2019/0394431 A1 | 12/2019 | Flessas |

* cited by examiner

ROBOTICALLY MOVABLE DISPLAY SYNCHRONOUSLY MOVABLE WITH ROBOTICALLY MOVABLE CAMERA FOR DISPLAYING CAPTURED IMAGES IN IDENTICAL ORIENTATION

FIELD OF THE INVENTION

The present invention relates to the display of images captured by a camera via a video display.

BACKGROUND OF THE INVENTION

Various circumstances exist where it is desirable to capture images, such as still or moving images, via an image capture device and then display those images via a separate display. One problem with the display of images via video displays is that changes in the orientation of the images may be incompatible with the display displaying the images.

For example, a display which is used to display images in a store for advertising purposes may be mounted to a wall in landscape orientation. Various images might then be shown on the display. If the images are also in landscape orientation, they will be displayed properly via the display. However, if some of the images are arranged in portrait orientation, problems arise.

First, the image could be rotated so that its orientation matches that of the display. However, this would result in viewers seeing the image sideways or lying on its side.

Second, if the image is displayed in its proper orientation, the image has to be scaled for display by the display, such as by reducing the dimensions of the image so that the full height of the image can be displayed via the display. The image then has a width dimension which is less than that of the display, so that bars or other elements must be displayed on either side of the displayed image to fill the space between the sides of the image and the sides of the display. In addition, the size of the displayed image is reduced, making it less visible.

The present invention comprises systems and methods for addressing these and other problems.

SUMMARY OF THE INVENTION

Aspects of the invention comprise robotic cameras, robotic displays, systems including one or more robotic cameras and one or more robotic displays, and methods of capturing and displaying images.

In one embodiment of the invention, a method of displaying images captured by an image capture device via at least one image display device comprises the steps of: (a) supporting the image capture device via a robotic camera mount which is configured to rotate the image capture device about at least one axis; (b) supporting the image display device via a robotic display mount which is configured to rotate the image capture device about at least one axis; (c) moving the robotic camera mount to move the image capture device to a first image capture device orientation; (d) capturing one or more first images in a first image orientation with the image capture device; (e) moving the robotic display mount to move the image display device to a first image display device orientation; (f) displaying the one or more first images in a first display orientation, which first display orientation is the same as the first image orientation; (g) moving the robotic camera mount to move the image capture device to a second image capture device orientation; (h) capturing one or more second images in a second image orientation; (i) moving the robotic display mount to move the image display device to a second image display device orientation; and (j) displaying the one or more second images in a in a second display orientation, which second display orientation is the same as the second image orientation.

In one embodiment of the invention, a system for displaying images captured by an image capture device comprises: a controller; a robotic camera comprising a robotic camera mount and an image capture device, the robotic camera mount comprising a head which is rotatable about at least one axis via actuation of at least one motor, and the image capture device mounted to the head for movement by the robotic camera mount; a robotic display comprising a robotic display mount and an image display device, the robotic camera mount comprising a head which is rotatable about at least one axis via actuation of at least one motor, and the image display device mounted to the hear for movement by the robotic display mount; the controller configured to generate control instructions for causing the robotic camera mount to move the image capture device to a first image capture device orientation in which the image capture device captures images in a first image orientation and for causing the robotic display mount to move the image display device to a first image display device orientation for displaying images in a first display orientation, which first display orientation is the same as the first image orientation when the images in the first image orientation are displayed by the image display device; and for causing the robotic camera mount to move the image capture device to a second image capture device orientation in which the image capture device captures images in a second image orientation and for causing the robotic display mount to move the image display device to a second image display device orientation for displaying images in a second display orientation, which second display orientation is the same as the second image orientation when the images in the second image orientation are displayed by the image display device.

In one embodiment, the robotic camera mount is configured to move the camera and robotic display mount is configured to move the display, linearly along each of three orthogonal axis, or combinations thereof. In another embodiment, the mounts are configured to move the camera and display in six degrees of freedom.

In one embodiment, the first image orientation is a portrait orientation and the first display orientation is a portrait orientation and the second image orientation is a landscape orientation and the second display orientation is a landscape orientation.

In one embodiment, the first image capture device orientation is a portrait orientation, the first image display device orientation is a portrait orientation, the second image capture device orientation is a landscape orientation and the second image display device orientation is a landscape orientation.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

In general, the invention comprises one or more robotically-controlled cameras and one or more robotically-controlled displays, such as video displays. In a preferred embodiment of the invention, the robotically-controlled displays are configured to be oriented in a manner which corresponds to the images captured by the one or more robotically-controlled cameras. As one example, when a robotically-controlled camera is positioned to capture one or more images in landscape orientation, the one or more displays are similarly (and preferably, synchronously) moved to a landscape orientation to display the "landscape" captured images, and when the robotically-controlled camera is moved to a position to capture one or more images in portrait orientation, the one or more displays are similarly (and preferably, synchronously) moved to a portrait orientation to display the "portrait" captured images.

Figure 1:
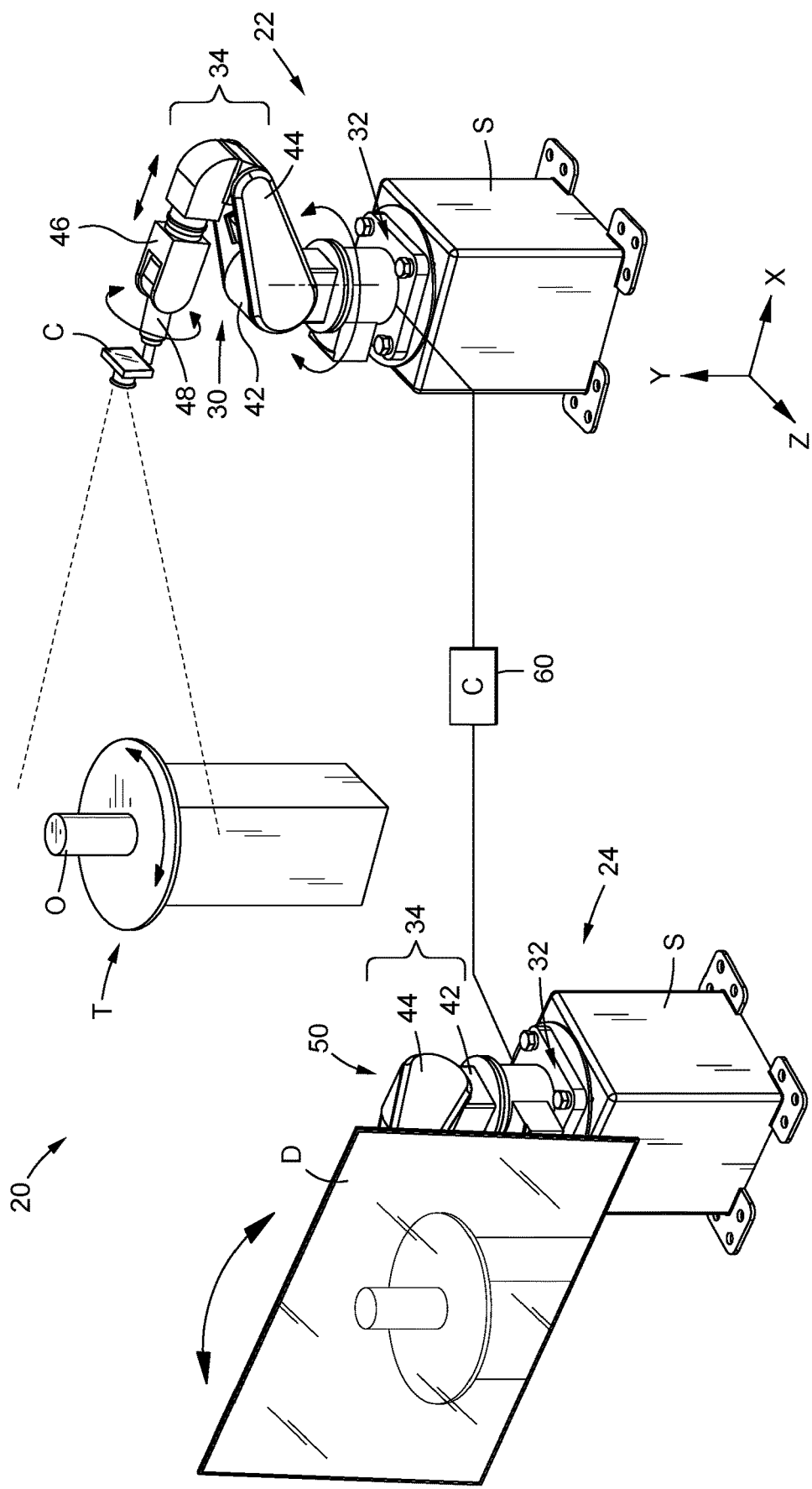
FIG. 1 illustrates a system in accordance with an embodiment of the invention.

FIG. 1 illustrates a system 20 in accordance with an embodiment of the invention. In one embodiment, the system 20 includes at least one robotic camera 22 and at least one robotic display 24.

The robotic camera 22 is moveable, thus permitting the position of an associated camera C to be changed. As detailed below, in a preferred embodiment, the robotic camera 22 can be used to change the position of the camera C about at least one axis so that it can capture images in "portrait" and "landscape" orientations, and at other desired orientations therebetween. In a most preferred embodiment, the robotic camera 22 can be used to change the position of the camera C freely in three-dimensional space.

In a preferred embodiment, the robotic camera 22 is referred to as "robotic" because it is a device which can change positions in an automated fashion. In particular, the robotic camera 22 is preferably capable of multiple movements without manual intervention (i.e. can move between various positions based upon a sequence of instructions without each movement being prompted by individual user input).

Preferably, the robotic camera 22 comprises a robotic mount 30 which is movable so that an associated camera C is linearly moveable in three (3) directions or along three (3) axis which are orthogonal to one another, and/or in combinations of those directions. For example, as illustrated in FIG. 1, the robotic mount 30 may be configured to move a camera C linearly in an "x" direction, a "y" direction and a "z" direction, as well as combinations thereof (e.g. in a direction which is in both an x and y direction, y and z direction, etc.), whereby the robotic mount 30 is capable of moving the camera C freely in three-dimensional space. Further, the robotic mount 30 may be capable of rotational movement about one or more of such axis, such as about the x, y, and/or z axes (or such rotation might be accomplished via the linear movements). In this manner, the robotic mount 30 may manipulate the camera C to move in any combination of linear and rotational movement.

In one embodiment, the robotic mount 30 comprises a base 32 and a movable support or mount 34. The base 32 is configured to support the movable mount 34, and the moveable mount 34 is preferably moveable relative to the base 32, thus permitting an associated camera C (which is connected to or supported by the mount 24), to be moveable.

Referring to FIG. 1, the base 32 may have a variety of configurations, including various shapes and sizes. In general, the base 32 is configured to be mounted to or supported by (by connection or merely resting or setting upon) a support surface, such as a wall, floor or other support S, such as a portion of another object. The base 32 may have a generally planar bottom or lower surface for engaging a generally planar support surface, or may have other configurations for engaging support surfaces of other shapes. In one embodiment, the base 32 may include one or more apertures for accepting fasteners which are placed into engagement with the support surface, for securing the base 32 in a fixed position by temporarily or permanently connecting the base 32 to that surface. As described below, however, the entire robotic camera mount 30 may be movable, such as by having a base which is movable relative to a support surface, including by rolling or walking. In the embodiment illustrated, the robotic camera mount 30 is located on a horizontal supporting surface, but it could be mounted upside down, to a vertically extending support, etc.

In a preferred embodiment, the moveable support 34 is positioned between the base 32 and the camera C. This support is preferably moveable in at least three (3), and preferably six (6) degrees of freedom, and is thus moveable in at least two (2), and more preferably three (3), dimensions or dimensional space. As indicated above, the robotic mount 30 preferably at least allows the camera C to be rotated. In a preferred embodiment, however, movement is permitted linearly relative to each of three generally orthogonal axis (as well as combinations thereof), as well as rotationally around each axis. As disclosed below, the movable support 34 may permit redundant movement in one or more directions. For example, the movable support 34 may include two or more elements which permit it (and thus an object connected thereto, such as a camera C) to be moved in the x, y and/or z direction (three degrees of freedom), and to rotate about the x, y and/or z axis (3 additional degrees of freedom), or various combinations thereof.

As illustrated, in one embodiment, the mount includes a main support 42. In one embodiment, the main support 42 is mounted for rotation relative to the base 32, i.e. about the y-axis as illustrated in FIG. 1. The main support 42 may be mounted, for example, on a bearing supported shaft which is connected to the base 32, or by other means.

In one embodiment, a lower arm 44 is rotatably mounted to the main support 42. As illustrated, the main support 42 has a first portion mounted to the base 32 and a second portion to which the lower arm 44 is mounted. In a preferred embodiment, the lower arm 44 is rotatably mounted to the main support 42 about a shaft or other mount. In the configuration illustrated, the lower arm 44 is mounted for rotation about a z-axis (i.e. an axis which is generally perpendicular to the axis about which the base 30 rotates).

As further illustrated, an upper arm 46 is rotatably mounted to the lower arm 44. In one embodiment, a first or distal portion of the lower arm 44 is mounted to the main support 42, and the upper arm 46 is mounted to a top or proximal portion of the lower arm 44. In one embodiment, the upper arm 46 is also mounted for rotation about the z-axis.

In one embodiment, a head 48 is located at a distal portion of the upper arm 36. Preferably, the camera C is mounted to the movable mount 34 via the head 48. In one embodiment, the head 48 is mounted for rotation relative to the upper arm 46 (and thus the remainder of the movable mount 34). In one configuration, the head 48 may be configured to both swivel relative to the upper arm 36 (e.g. rotate about the z-axis as illustrated in FIG. 1) and rotate relative to the upper arm 46 (e.g. rotate about the x-axis in FIG. 1).

The various portions of the movable support 34 may be connected to one another (and to the base 32) in a variety of fashions. For example, the various portions may be connected to one another via a shaft and bearing mount, where the shaft is connected to one component and engages one or more bearings supported by the other component, such that the shaft may move relative to the bearing(s), thus permitting the components to move relative to one another. The portions of the movable support 34 might be mounted to one another in other fashions, however, such as by hinged mounting or the like.

Preferably, the movable support 34 includes means for moving the one or more portions thereof, and thus the camera C connected thereto. As illustrated, the movable support 34 may include one or more motors for moving the components thereof. The motors may be electrical motors. In other embodiments, hydraulics or other means may be utilized to move one or more of the components of the movable support 34. For example, a hydraulic arm might be utilized to move the upper arm 46 relative to the lower arm 44 in an up and down direction.

Of course, the robotic camera mount 30 might have various other configurations. For example, while the robotic camera mount 30 described above is redundant in its capacity to move in certain directions (i.e. the upper and lower arms 46, 44 are both configured to move about the z axis and thus redundantly in the x and y directions), the robotic camera mount 30 could be configured in other fashions (such as by having only a single portion configured to move in each direction). It will also be appreciated that the number of members or elements which the movable mount 24 comprises may vary. For example, the robotic camera mount 30 might comprise a base and a head which is mounted to the base, such as via a swivel, permitting the head to be moved in at least two dimensions. Various configurations of members may also be utilized to allow movement in various directions. For example, aside from swivels or the rotating connections of the movable mount illustrated in FIG. 1, members may be configured to telescope, slide or otherwise move linearly (i.e. move along an axis rather than about an axis), or be configured to move along paths other than curved paths. For example, an arm might be rotatably connected to a base, where the arm is telescopic and can thus be extended or retracted.

As another example, the entire robotic camera mount 30 may be movable. For example, the robotic camera mount 30 might be movable in one or more directions via wheels riding on a track (not shown) or otherwise, including where the wheels may rotate, thus allowing the robotic camera mount 30 to rotate or spin, or might be configured to move in one or more directions by walking (such as by including one or more legs).

As indicated, in a preferred embodiment, the robotic camera mount 30 is configured to move at least one camera C. In one embodiment, the camera C is directly attached to the movable support 34, such as to the head 48. In general, the robotic camera mount 30 has a portion (such as the head 48 or an element connected thereto) which is moveable in the manner described above (as indicated above, in one embodiment, movement of the various portions of the movable support 34 allow the head 48 to be moved in three (3) generally orthogonal directions and combinations thereof, as well as rotationally about those directions) and is thus configured to move an associated camera C.

The camera C might be of various types. In a preferred embodiment, the camera C is configured to capture electronic images, such as via a CCD, MOS, CMOS or other types of image capture devices. The images may be single frame images or multi-frame images or "videos." In the embodiment illustrated, a single camera C is connected to a single robotic camera mount 30. In other embodiments, multiple cameras might be mounted to a single mount 30. While the term "camera" is used herein, the images might be captured by any number of image capture devices (which may or may not be called cameras) and may or may not include features such as fixed or movable lenses, flashes and other features.

In one embodiment, the camera C is configured to capture images which have an aspect ratio wherein the height and width of the image are not equal, whereby, depending on the orientation of the camera C, the captured images have one orientation which may be referred to as a "portrait" orientation (where the largest dimension of the image, when the image is viewed in its normal position, is generally oriented vertically) and a "landscape" orientation (where the largest dimension of the image, when the image is viewed in its normal position, is generally oriented horizontally).

As indicated, the system 20 also comprises one or more robotic displays 24. Each robotic display 24 preferably comprises one or more displays D connected or mounted to a robotic display mount 50. In one embodiment, the robotic display mount 50 is similar to the robotic camera mount 30 described above, such as comprising a base 32 and a movable mount 34. As described above, the movable mount 34 may have various configurations, including one where the movable mount 34 has a main support 42, lower arm 44, and an upper arm and head (not shown). The one or more displays D may be connected or mounted to the head for movement by the movable support 34.

The one or more displays D (or "image display devices") may be of various types. In one embodiment, the display D may comprise a video display such as a plasma, LED, OLED, LCD, DLP or other type. The display might also comprise a projector for causing one or more images to be displayed on a remote surface. In one embodiment, the display D is a generally flat-panel display. The display D may have various sizes. In one embodiment, the display D has a 4:3, 16:9 or other aspect ratio where a width and height of the display screen are not equal, whereby the display D has one orientation which may be referred to as a "portrait" orientation (where the largest dimension of the screen is generally orientated vertically) and a "landscape" orientation (where the largest dimension of the screen is generally oriented horizontally).

In one embodiment, the system 20 includes means for controlling the one or more robotic cameras 22 and robotic displays 24. In one embodiment, the system 20 includes a controller 60. In a preferred embodiment, the controller 60 may comprise or include a computing device. Various instructions may be provided from the controller 60 to the robotic camera 22 and robotic display 24, causing them to move. For example, a user might provide an input to the controller 60, which input is a request to move the camera C or display D from a first to a second position. The controller 60 may generate one more signals or instructions which are transmitted to the robotic camera 22 and/or robotic display 24 for causing them to so move. The signal might comprise opening of a switch which allows electricity to flow to one or more motors of the robotic camera 22 and/or robotic display 24 for a predetermined period time which is necessary for the motor to affect the desired movement. In another embodiment, the signal might comprise an instruction which is received by sub-controller of the mount, which sub-controller then causes the mount to move as desired.

Figure 2:
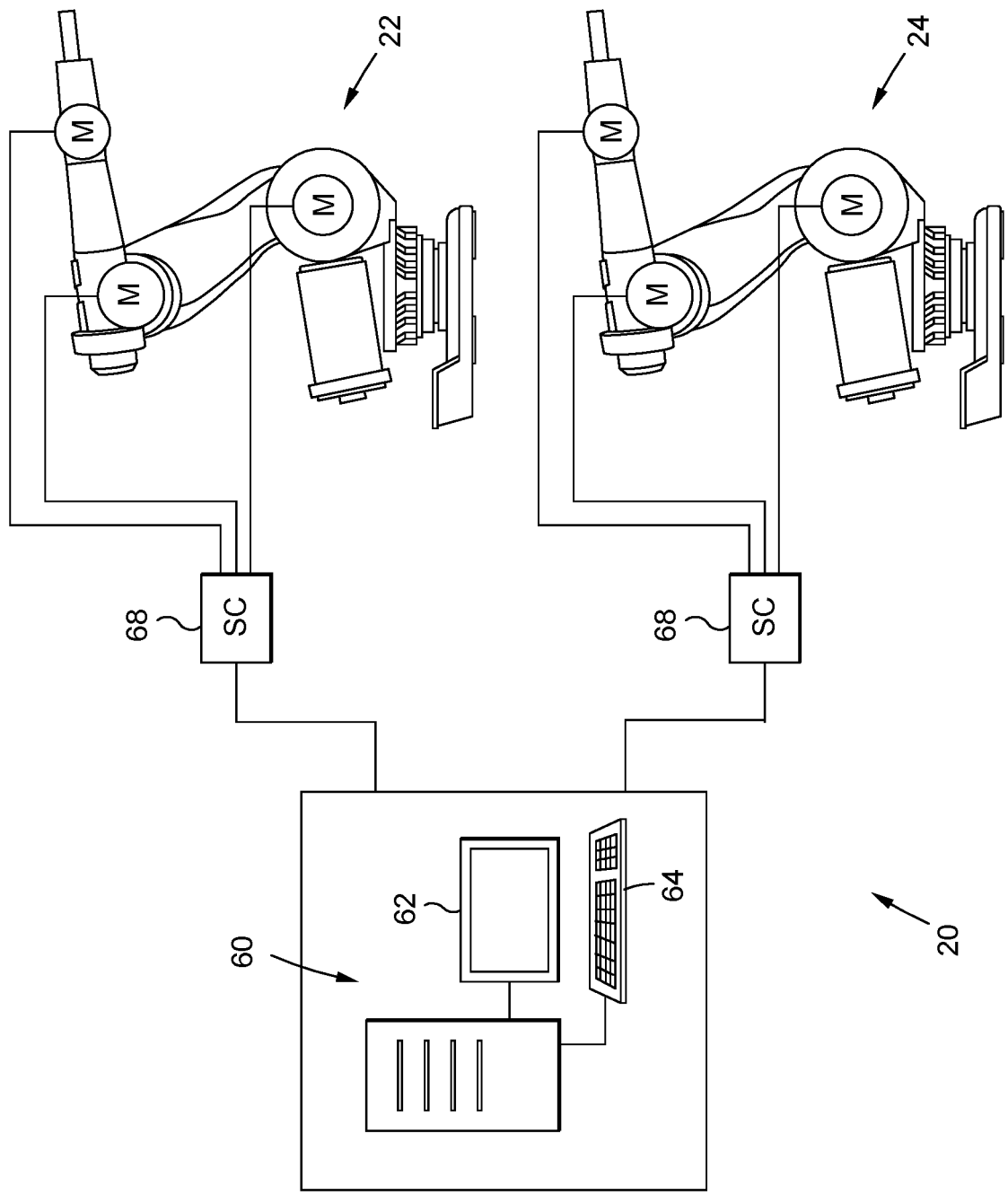
FIG. 2 illustrates a control configuration for the system illustrated in FIG. 1.

FIG. 2 illustrates one embodiment of a control system of the present invention. As illustrated, the system 20 includes a main controller 60. In one embodiment, the main controller 60 may comprise a processor which is capable of executing machine readable code or software, such as stored in a memory in association with the processor. As indicated, that software may comprise a set of instructions which, when executed, cause the controller to move the robotic camera 22 and robotic display 24 in a predetermined manner, randomly or otherwise. The software might also or instead simply comprise a set of instructions which permits a user to provide input of desired movement (e.g. which allows the user to "program" the robotic camera 22 and/or robotic display 24 to move, either in direct response thereto or to generate a programmed movement (which may be implemented immediately or be stored for implementation at a later time).

In one embodiment, the main controller 60 includes one or more user input devices 64, such as a mouse, keyboard, touch-screen or the like, via which the user may provide input. The main controller 60 might generate one or more graphical user interfaces for display on a control display 62 and the user may interact with the interface to provide input (such as by inputting text, clicking boxes, etc.).

In one embodiment, control signals or instructions may that are generated or otherwise output by the main controller 60 may be transmitted to a robotic cable mount sub-controller 68. Such a sub-controller 68 might, for example, be a controller which is located adjacent to the robotic camera 22 or robotic display 24 or within a housing or portion thereof. The sub-controller 68 may process the control instruction and use them to operate the various portions of the robotic camera 22 or robotic display 24, such as one or more motors M. For example, the sub-controller 68 may parse instructions from the main controller 60 so as to individually control each motor M in a manner which effectuates the main control instructions.

The main controller 60 might communicate with each robotic camera 22 and robotic display 24 via wired or wireless communication links. For example, main controller 60 might transmit signals via a RS-232 communication link including a wired pathway to the sub-controller 60 of the robotic camera 22 or robotic display 24. Alternatively, the main controller 60 and the sub-controllers 68 might both include wireless transceivers. In this manner, the main controller 60 may transmit instructions to the robotic camera 22 and robotic display 24 wirelessly.

Of course, other control configurations are possible. For example, the main controller 60 may comprise a server. One or more users may communicate with the server, such as from user stations (like desktop or laptop computers) or via other devices such as mobile devices including phones or tablets. In one embodiment, the server may be configured as a webserver where users may interface with the server via a web-page. In other configurations, the controller might be a mobile communication device such as an Apple iPhone® which is executing a control application.

Aspects of methods of moving the one or more cameras and one or more displays, including via a system 20 such as described above, will now be described.

In one embodiment of a method, the position of a camera C, including its orientation, is controlled, such as via a robotic camera mount 30. The position of a display D, including its orientation, is also controlled, such as via a robotic display mount 50. In one embodiment, the orientation of the video display D is controlled so that it is the same as (e.g. matches) that of the camera C. In particular, in one embodiment, the camera C may be oriented to capture images in a landscape orientation, a portrait orientation, or orientations therebetween. The orientation of the display D is controlled so that it is the same as the orientation of the camera C (or at least the orientation of the images captured thereby).

One example of use of the invention will be described with reference to FIGS. 3A, 3B and 3C.

Figure 3A:
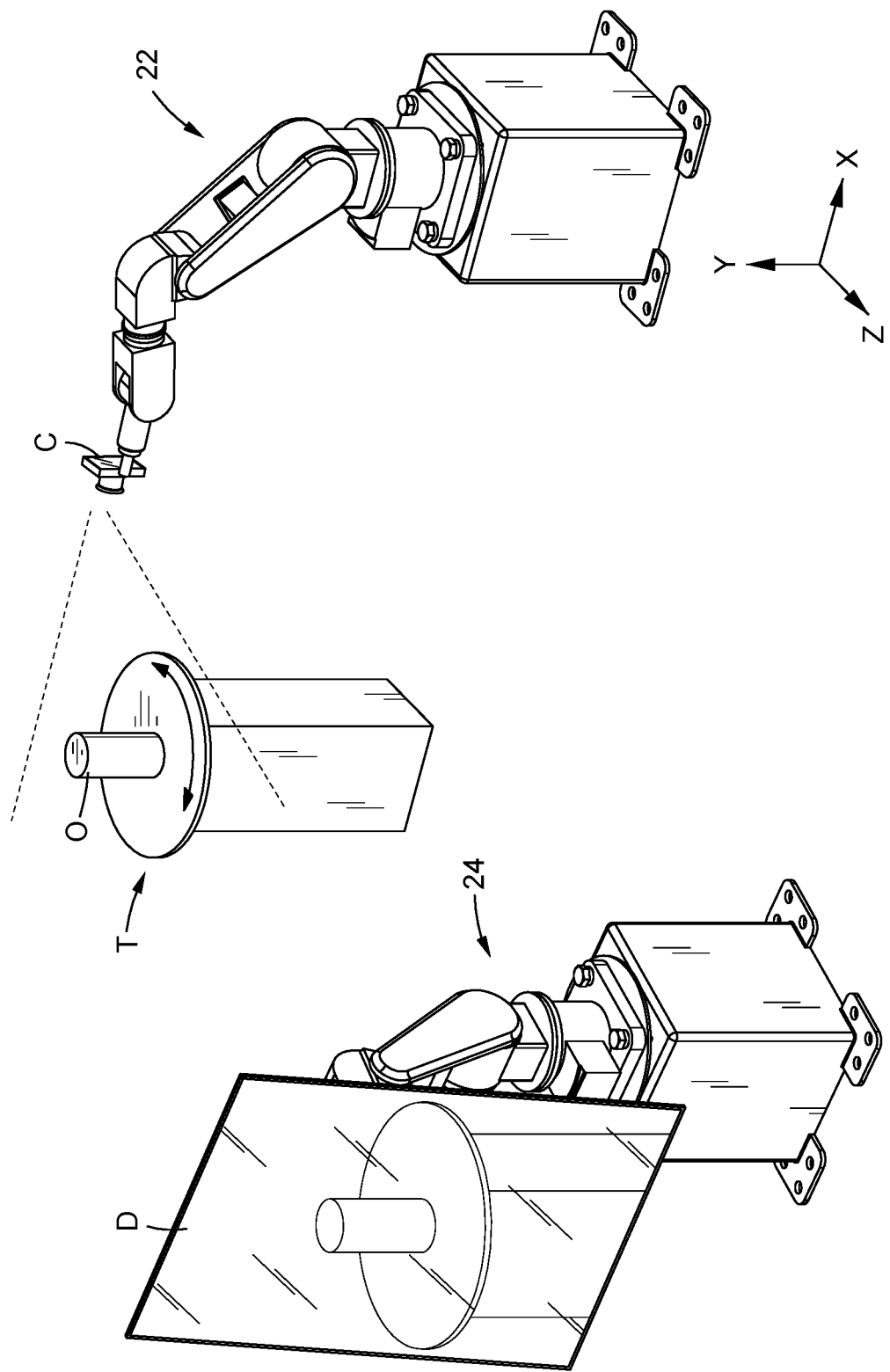
FIGS. 3A-C illustrate aspects of use of the system illustrated in FIG. 1.

As illustrated in FIG. 3A, the robotic camera C may be controlled to cause the camera C to capture one or more images in a portrait orientation. For example, this may be accomplished by using the robotic camera mount 30 to move the camera C into a first position in which it captures images in this orientation (which may correspond to any number of positions of the camera C, depending on the particular camera and how the camera is configured). For example, as illustrated, the camera C might be configured to capture portrait oriented images of an object O, such as which is located on a turntable T. Of course, the camera C might be used to capture images of anything, whether an object O, scenery or an environment, people, animals, goods, etc.

At the same time, the robotic display D is controlled to cause the display D to display the images in portrait orientation (relative to the aspect ratio of the display), e.g. by moving the robotic display D to the corresponding display position.

Figure 3B:
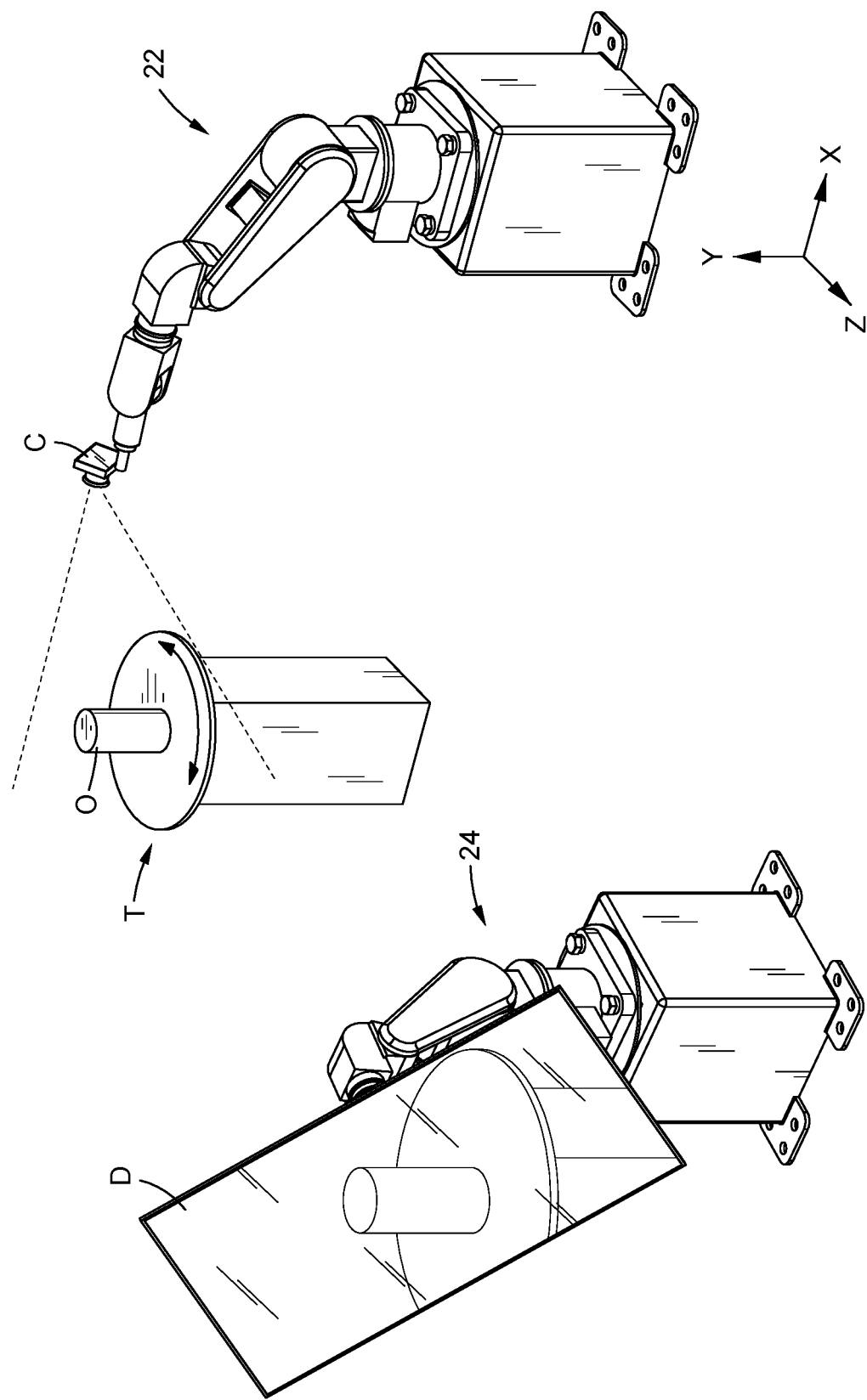
Figure 3C:
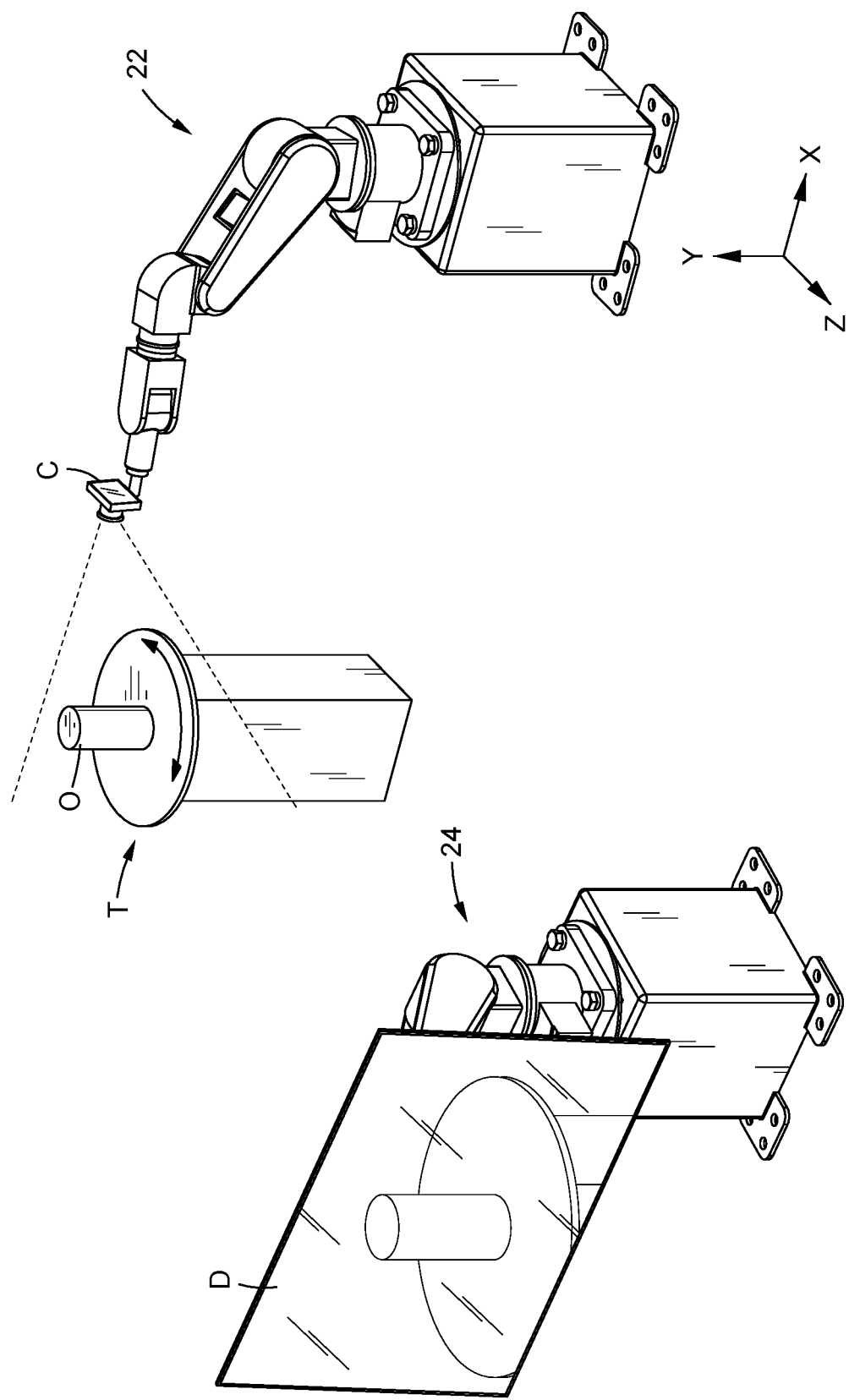

As illustrated in FIGS. 3B and 3C, the orientation or position of the camera C may be changed. When this occurs, the orientation or position of the display D is preferably also changed so that it displays images captured by the camera C in the same orientation. For example, as illustrated in FIG. 3C, the camera C might be moved to a position in which it captures images in landscape orientation. At that same time, the display D would be positioned so that it displays the images in landscape orientation corresponding to the aspect ratio of the display D (e.g. the "tallest" dimension of the display D is aligned vertically to match the tallest dimension of the image being displayed). As illustrated in FIG. 3B, as the camera C is moved between the positions illustrated in FIGS. 3A and 3C, the display D would similarly be moved, whereby as images are captured by the camera C in various orientations, the images are displayed by the display D in the same orientation.

As indicated above, synchronous control of the camera C and display D may be accomplished by a control system 20. The control system 20 may send commands to both the robotic camera 22 and robotic display 24 to cause them to move synchronously.

In one embodiment, not only might the orientation of the camera C and display D be changed, but their positions may also be changed. In one embodiment, their positions may also be synchronized. For example, as illustrated in FIG. 3A, when the camera C is taking images in portrait orientation, it may be a first distance away from the object O, and the display D may be in a first spatial position (such as a first distance from a viewer). As illustrated in FIG. 3C, when the camera C is taking images in landscape orientation, the camera C may be located a second (closer) distance away from the object O, such as by moving the camera C outwardly via the robotic camera mount 30. At that time, the display D may also be moved outwardly to a second spatial position (such as towards the viewer) via the robotic display mount 50. Of course, the spatial positions of the camera C and display D might be moved in various corresponding manners without changing the orientations thereof, or in combination with changes in the orientations thereof. Thus, in a preferred embodiment of the invention, the display D is synchronously maintained in the same orientation and relative position as the camera C, and/or the motions thereof are synchronized/matching.

As indicated above, the system 20 might include more than one robotic display 24 (such as for displaying the same images from one camera C), or might include more than one robotic camera 22 and more than one robotic display 24.

In another embodiment, the robotic display D may be controlled based on data obtained from the camera C that corresponds to the images taken by the camera C. For example, the camera C may comprise one or more sensors such as gyroscopes, accelerometers, and the like to detect a position and orientation of the camera. The position and orientation data of the camera may be associated with each image captured by the camera C. Note that the position and orientation data may be obtained by the camera C in other manners such as through image recognition software, from the control instructions sent to the robotic camera 22, or the like.

Accordingly, as the robotic camera 22 receives control instructions and the camera C obtains images, the position data and the images may be correlated and stored and/or transmitted to the robotic display D. The robotic display 24 may then be configured to display the images and rotate the display 24 based on the position and orientation data that corresponds with displayed images. In this manner, the robotic display 24 may not display the images synchronously with the movement of the robot camera 22 but may also display the images and the corresponding orientations at a later time.

It should be noted that while the orientations of portrait and landscape have been used for ease of explanation, the robotic camera 22 and the robotic display 24 may be configured to move synchronously (or at least move synchronously to orientation and position data corresponding to displayed images) about multiple axes simultaneously. For example, the robotic camera 22 may move the camera C above the object O requiring rotation about the z axis shown in FIGS. 3A-3B (which is perpendicular to the x axis about which the camera C rotates from portrait to landscape orientations). The robotic display 24 may be configured to rotate synchronously with the robotic camera. In some embodiments where the robotic display 24 moves based on position and orientation data from the camera C, the camera C may be held by a person photographing the object O instead of being held by the robotic camera 22. In this instance, the robotic display 24 may mimic the movement and view of the camera C of a human photographer/videographer.

Further, the robotic display 24 may be configured to rotate synchronously and inversely to the robotic camera 22 (or to position data corresponding to obtained images from the camera C). For instance, in the example just described, the robotic camera 22 may move and rotate so the camera C obtains a view from above the object O. The robotic display 24, however, may move in an inverse manner (e.g. moving downward and rotating in an opposite direction as compared to the robotic camera) to allow the view the object O that is now displayed on the display D to be from the same position and orientation of the camera.

The invention has various uses and benefits. The present invention solves the problems noted in the Background above by moving the display into a position in which it is oriented to match the orientation of the image which is to be displayed. In a preferred embodiment, the display displays images which are captured in real time via a camera.

As one implementation of use, the system 20 might be used to capture images of an object which is being worked on (car, airplane, etc.), where technicians need to view the images remotely. The technicians may need to change the orientation of the camera to gain access to the area they wish to view or to get a better viewing angle. In accordance with the invention, the associated display moves synchronously with the camera so that the captured images are always displayed in the same orientation as they are captured, making it much easier for the technicians to view the images.

As another example, a store might wish to display a good, such as a pair of shoes. In order to allow many customers to see the shoes, the store might take pictures of the shoes and display the picture of the shoes. However, the store might wish to show images of the shoes taken from various perspectives, angles and distances, thereby giving the customer more information regarding how the shoe looks from different perspectives and providing detail of various features of the shoe. In accordance with the invention, the system might be used to capture images of the shoe (including in a streaming video format) and have those images be displayed on one or more displays. As illustrated in FIGS. 3A-3C, the shoes might be placed on a support surface, such as a stand or even a rotating stand. The robotic camera C might then be used to capture images of the shoes from various perspectives (including different angles), from different distances, and in different orientations. As indicated above, those images may then be displayed using one or more robotic displays, where the display is moved synchronously with the captured images, such as to cause the display to display the images in the same orientation as they are captured. For example, the camera might be oriented to capture the sides of the shoes with images in landscape orientation, when the camera is moved to capture images of the rear of the shoes (so that the corresponding images show the length of the shoes in the horizontal/landscape direction on the display), the camera might be oriented to capture those images in portrait orientation (with the display correspondingly oriented to display the images).

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A method of displaying images captured by an image capture device via at least one image display device, comprising the steps of:
   supporting said image capture device via a robotic camera mount which is configured to rotate said image capture device about at least one axis;
   supporting said image display device via a robotic display mount which is configured to rotate said image capture device about at least one axis;

moving said robotic camera mount to move said image capture device to a first image capture device orientation;

capturing one or more first images in a first image orientation with said image capture device;

moving said robotic display mount to move said image display device to a first image display device orientation;

displaying said one or more first images in a first display orientation, which first display orientation is the same as said first image orientation;

moving said robotic camera mount to move said image capture device to a second image capture device orientation;

capturing one or more second images in a second image orientation;

moving said robotic display mount to move said image display device to a second image display device orientation;

displaying said one or more second images in a in a second display orientation, which second display orientation is the same as said second image orientation.

2. The method in accordance with claim 1 wherein said robotic camera mount is further configured to move said image capture device linearly along each of three orthogonal axis, or combinations thereof.

3. The method in accordance with claim 1 wherein said robotic camera mount is configured to move said image capture device in six degrees of freedom.

4. The method in accordance with claim 1 wherein said robotic display mount is further configured to move said image display device linearly along each of three orthogonal axis, or combinations thereof.

5. The method in accordance with claim 1 wherein said robotic display mount is configured to move said image display device in six degrees of freedom.

6. The method in accordance with claim 1 wherein said image capture device comprise a camera which is configured to capture images in electronic form.

7. The method in accordance with claim 1 wherein said image display device comprises a video display.

8. The method in accordance with claim 1 wherein said first image orientation is a portrait orientation and said first display orientation is a portrait orientation.

9. The method in accordance with claim 8 wherein said second image orientation is a landscape orientation and said second display orientation is a landscape orientation.

10. The method in accordance with claim 9 wherein said first image capture device orientation is a portrait orientation, said first image display device orientation is a portrait orientation, said second image capture device orientation is a landscape orientation and said second image display device orientation is a landscape orientation.

11. A system for displaying images captured by an image capture device comprising:
a controller;
a robotic camera comprising a robotic camera mount and an image capture device, the robotic camera mount comprising a head which is rotatable about at least one axis via actuation of at least one motor, and the image capture device mounted to the head for movement by the robotic camera mount;
a robotic display comprising a robotic display mount and an image display device, the robotic camera mount comprising a head which is rotatable about at least one axis via actuation of at least one motor, and the image display device mounted to the head for movement by the robotic display mount;
said controller configured to generate control instructions for causing said robotic camera mount to move said image capture device to a first image capture device orientation in which said image capture device captures images in a first image orientation and for causing said robotic display mount to move said image display device to a first image display device orientation for displaying images in a first display orientation, which first display orientation is the same as said first image orientation when said images in said first image orientation are displayed by said image display device; and
for causing said robotic camera mount to move said image capture device to a second image capture device orientation in which said image capture device captures images in a second image orientation and for causing said robotic display mount to move said image display device to a second image display device orientation for displaying images in a second display orientation, which second display orientation is the same as said second image orientation when said images in said second image orientation are displayed by said image display device.

12. The system in accordance with claim 11 wherein said robotic camera mount is configured to move said head in six degrees of freedom.

13. The system in accordance with claim 11 wherein said robotic display mount is configured to move said head in six degrees of freedom.

14. The system in accordance with claim 11 wherein said image capture device comprise a camera which is configured to capture images in electronic form.

15. The system in accordance with claim 11 wherein said image display device comprises a video display.

16. The system in accordance with claim 11 wherein said first image orientation is a portrait orientation and said first display orientation is a portrait orientation.

17. The system in accordance with claim 16 wherein said second image orientation is a landscape orientation and said second display orientation is a landscape orientation.

18. The system in accordance with claim 17 wherein said first image capture device orientation is a portrait orientation, said first image display device orientation is a portrait orientation, said second image capture device orientation is a landscape orientation and said second image display device orientation is a landscape orientation.

19. The system in accordance with claim 11 wherein said robotic camera mount comprises a lower arm movably connected to a base, an upper arm movably connected to said lower arm, and said head movably connected to said upper arm.

20. The system in accordance with claim 11 wherein said controller comprises a main controller comprising a processor, a memory and machine-readable code stored in said memory and executable by said processor, and at least one robotic camera sub-controller which is configured to receive instructions from said main controller and output control instructions to said at least one motor of said robotic camera and at least one robotic display sub-controller which is configured to receive instructions from said main controller and output control instructions to said at least one motor of said robotic display.

* * * * *